United States Patent
Sato et al.

[11] Patent Number: 5,979,884
[45] Date of Patent: Nov. 9, 1999

[54] VIBRATION ISOLATING APPARATUS

[75] Inventors: Teruo Sato; Ikuo Takeuchi, both of Aichi; Masashi Takaoka, Osaka; Yukio Takashima, Osaka; Yosei Kodama, Osaka, all of Japan

[73] Assignee: Toyo Tire & Rubber Co., Ltd., Osaka, Japan

[21] Appl. No.: 09/025,271

[22] Filed: Feb. 18, 1998

[30] Foreign Application Priority Data

Feb. 28, 1997 [JP] Japan ................................. 9-045737

[51] Int. Cl.⁶ .................................................. F16F 13/00
[52] U.S. Cl. .................... 267/140.13; 267/219; 267/292; 267/141.4; 267/140.4; 267/153; 267/140.5
[58] Field of Search .......................... 267/140.11, 140.13, 267/219, 220, 141, 153, 292, 293, 140.3, 140.4, 141.4, 141.5, 141.3, 140.5; 248/562, 636, 638, 573, 574, 635; 180/300, 312, 902

[56] References Cited

U.S. PATENT DOCUMENTS

| | | |
|---|---|---|
| 3,865,068 | 2/1975 | Haasl . |
| 3,929,089 | 12/1975 | Lambrecht et al. . |
| 3,934,537 | 1/1976 | Hall . |
| 4,003,330 | 1/1977 | Compton . |
| 4,213,718 | 7/1980 | Lumby . |
| 4,286,777 | 9/1981 | Brown . |
| 4,306,708 | 12/1981 | Gassaway et al. . |
| 4,666,412 | 5/1987 | Rawlings . |
| 4,974,818 | 12/1990 | Kato ................................... 267/140.13 |
| 5,195,728 | 3/1993 | Skipper .............................. 267/140.13 |
| 5,295,671 | 3/1994 | Nakagaki et al. .................. 267/140.13 |
| 5,310,276 | 5/1994 | Bergers et al. .......................... 267/141 |
| 5,316,275 | 5/1994 | Maeno et al. ...................... 267/140.13 |
| 5,651,535 | 7/1997 | David ................................... 267/140.5 |
| 5,735,511 | 4/1998 | Stöcker et al. ..................... 267/140.13 |

FOREIGN PATENT DOCUMENTS 08210429  8/1996  Japan .

*Primary Examiner*—Douglas C. Butler
*Attorney, Agent, or Firm*—Jordan and Hamburg LLP

[57] ABSTRACT

A vibration isolating apparatus mainly used for supporting an engine for a compact vessel which is structured such as to securely perform a stopper operation and to widely improve a durability at a time when a large load is given, without changing a fastened position, a height and a mounting operability. There is provided a vibration isolating apparatus wherein an opening portion close to a lower end in a cylindrical body metal fitting and a lower end mounting metal fitting disposed below the same are connected to each other by a body rubber portion disposed between the both elements, an upper end mounting metal fitting to which an engine mounting bolt is provided in a projecting manner is fixedly attached to a flange portion of an upper end portion of the body metal fitting by caulking, an opening edge portion close to a lower end of the body metal fitting is extended outward at least in both sides opposing to each other so as to be formed as a stopper portion having an upper and a lower surfaces covered with a stopper rubber, an annular stopper metal fitting is disposed on the stopper portion in such a manner as to provide a predetermined interval with respect to an outer peripheral surface of the body metal fitting, and the stopper metal fitting is fixedly provided in the lower end mounting metal fitting.

4 Claims, 4 Drawing Sheets

VIBRATION ISOLATING APPARATUS

BACKGROUND OF THE INVENTION

1. Field of the Invention

The present invention relates to a vibration isolating apparatus used for supporting an engine mainly for a compact vessel or an automotive vehicle in such a manner as to isolate a vibration.

2. Description of the Related Art

Conventionally, as a vibration isolating apparatus provided for supporting an engine corresponding to a vibration generating source, for example, in a compact vessel in such a manner as not to transmit a vibration thereof to a vessel body, a vibration isolating apparatus comprising an upper mounting metal fitting to which a bolt for mounting an engine is provided in a projecting manner, a lower mounting metal fitting mounted to a body end and a body rubber portion disposed between both of the metal fittings is used.

Further, in order to increase an effect for reducing a vibration and a sound of the engine, it is considered to use a liquid-enclosing type vibration insulating apparatus which is structured such that an opening portion close to a lower end in a cylindrical body metal fitting and a lower end mounting metal fitting disposed below the same are connected to each other by a body rubber portion disposed between the two metal fitting, and an upper end mounting metal fitting is fixedly attached to an upper end portion of the body metal fitting so as to form two liquid chambers communicating between a diaphragm made of a rubber film and disposed therewithin and the body rubber portion by an orifice.

As the vibration isolating apparatus of the above type, particularly in order to support an engine having a heavy weight for a compact vessel without a slackness and a play and optionally adjust a supporting height, the applicant of this invention has suggested that a support portion provided in the upper end mounting metal fitting in a projecting manner and constituted by an engine mounting bolt is structured such as to be a double nut construction constituted by a washer based nut and a nut for preventing a slackness and removal (JP-A-08210429(1996) (Japanese Patent Unexamined Publication No. 8-210429)).

In the suggested apparatus mentioned above, as means for restricting a large displacement due to the engine vibration, a part of the vibration isolating base body has a projecting portion to which a projecting piece from the body metal fitting is inserted and a stabilizer is fixed to the upper end mounting metal fitting, so that the stabilizer is elastically brought into contact with the projecting portion at a time of a large displacement to a vertical direction or a direction perpendicular to the axial direction, thereby achieving a stopper effect.

In this case, since the stopper portion is brought into contact with only one side of the vibration isolating apparatus and the stabilizer is fixed to only one fastening portion of the engine mounting bolt, a support strength serving as a stopper is not sufficient, so that there is a problem in a durability, for example, a deformation of the stabilizer is generated at a time when a large load (a large displacement) is given.

Particularly, as a vibration isolating mount for supporting the engine for a compact vessel, in view of the point mentioned above, it is desired that the vibration isolating apparatus is further improved.

SUMMARY OF THE INVENTION

The present invention is made by taking the above points into consideration, and an object of the invention is to provide a vibration isolating apparatus structured such as to securely perform a stopper operation and to widely improve a strength and durability at a time when a large load is given without changing a fastened position, a height and a mounting operability.

In accordance with the invention, there is provided a vibration isolating apparatus in which an opening portion close to a lower end in a cylindrical body metal fitting and a lower end mounting metal fitting disposed below the same are connected to each other by a body rubber portion disposed between the both fittings, an upper end mounting metal fitting to which an engine mounting bolt is provided in a projecting manner is fixedly attached to a flange portion of an upper end portion of the body metal fitting by caulking-for-fastening means, an opening edge portion close to a lower end of the body metal fitting is extended outward at least in both sides opposing to each other so as to be formed as a stopper portion having an upper and a lower surfaces covered with a stopper rubber, an annular stopper metal fitting is disposed on or above the stopper portion in such a manner as to provide a predetermined interval with respect to an outer peripheral surface of the body metal fitting, and the stopper metal fitting is fixed to the lower end mounting metal fitting.

In accordance with the vibration isolating apparatus of the invention, while the body metal fitting is displaced upward, downward, backward, forward, leftward or rightward relative to the lower end mounting metal fitting due to an elasticity of the vibration isolating base body constituted by a rubber elastic body caused by a vibration in the supporting engine, at a time of an upward large displacement, the stopper portion integrally formed with the body metal fitting is brought into contact with the annular stopper metal fitting fixed to the lower end mounting metal fitting at least in two opposite sides, thereby restricting further displacement. Further, in the case that the body metal fitting is largely displaced to the axial and perpendicular directions in the longitudinal and lateral directions, the outer peripheral surface of the body metal fitting is brought into contact with the inner periphery of the annular stopper metal fitting, thereby preventing further displacement.

Further, as well as the annular stopper metal fitting can be firmly fixed at two or more portions, the stopper metal fitting can be brought into contact with the stopper portion substantially all around the periphery, so that the apparatus can sufficiently resist against a large load (a large displacement), thereby achieving a secure and good stopper operation with respect to the displacement to the vertical direction and the axial and perpendicular directions in the longitudinal and lateral directions. Accordingly, a durability of the vibration isolating apparatus can be widely improved without giving any effect to the mounting operability such as the fastened position and the height.

In the vibration apparatus mentioned above, it is preferable that a part of the lower end mounting metal fitting is formed as a stopper receiving portion which is brought into contact with the stopper portion at a time when the stopper portion largely displaces downward. Accordingly, when a large load (a large displacement) is given to the lower direction by the engine weight, the stopper portion is brought into contact with the stopper receiving portion of the lower end mounting metal fitting, thereby preventing further compression and displacement.

Therefore, together with the stopper operation which is generated by the stopper metal fitting with which the stopper portion is upwardly brought into contact, a good stopper operation can be achieved against the large displacement in the vertical direction and a durability can be further increased.

Further, in the vibration isolating apparatus mentioned above, it is possible that an internal space surrounded by the body metal fitting, the upper end mounting metal fitting for covering the opening close to an upper end thereof, and the body rubber portion for covering the opening close to the lower end is formed as an air chamber, and both of the upper end flange portion of the body metal fitting and the upper end mounting metal fitting are directly caulked and fastened.

In this case, in the upper end flange portion of the body metal fitting, it is unnecessary to provide a stepped portion for fixing the partition member or the diaphragm in the case of the liquid-enclosing type apparatus, so that the apparatus can be firmly fixed while the caulking structure is simple, and further, it is easy to increase the thickness thereof. Accordingly, the durability of the vibration isolating apparatus can be widely improved without giving any effect to the mounting operability such as the fastened position and the height.

Still further, as the vibration isolating apparatus mentioned above, it is possible that in an internal space surrounded by the body metal fitting, the upper end mounting metal fitting for covering the opening close to an upper end thereof and the body rubber portion for covering the opening close to the lower end, a partition member and a diaphragm constituted by a rubber film is disposed in such a manner as to oppose to the body rubber portion and is fastened by caulking onto the upper end flange portion of the body metal fitting together with the upper end mounting metal fitting, a space held between the body rubber portion and the diaphragm is formed as two liquid chambers which are filled with a liquid in a sealed manner and are separated by a partition member, and the two liquid chambers are communicated with each other by an orifice disposed in the outer periphery of the partition member.

In the case of this vibration isolating apparatus, due to the vibration of the engine, the body rubber portion is deformed so that a volume change is generated in the two liquid chambers separated by the partition member, as a result, the liquid flows through the orifice in a reversible manner. Accordingly, by virtue of a flow resistance of the liquid and the vibration isolating effect of the body rubber portion, the durability is achieved against a large displacement as mentioned above, and a good vibration damping effect can be achieved, thereby being preferably employed to an automotive vehicle.

DETAILED DESCRIPTION OF THE PREFERRED EMBODIMENT

Figure 1:
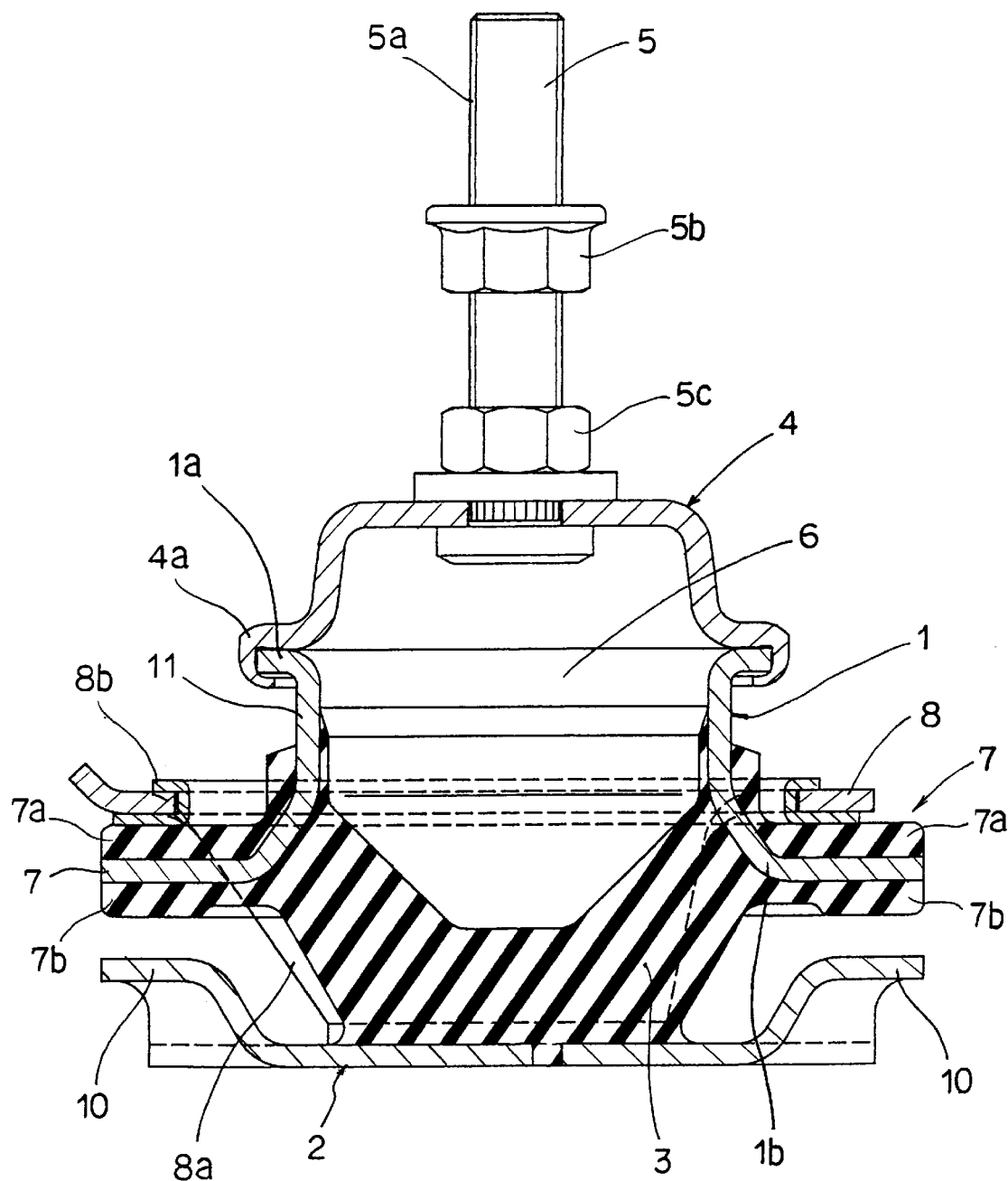
FIG. 1 is a vertical cross sectional view which shows a vibration isolating apparatus in accordance with an embodiment of the invention.

Next, an embodiment in accordance with the invention will be described below with reference to the attached drawings, however, the invention is not limited to this.

In the embodiment shown in FIGS. 1 to 3, reference numeral 1 denotes a body metal fitting having a cylindrical barrel portion 11 having an axial center in a vertical direction, and an opening portion close to a lower end of the body metal fitting 1 and a lower end mounting metal fitting 2 disposed below the opening portion in such an opposing manner with an interval are connected with disposing a body rubber portion 3 serving as a vibration isolating base body having substantially a reversed trapezoidal cross section and fixedly attached thereto in a sealed state by vulcanizing molding means between both elements. The body rubber portion 3 is structured such as to cover the opening close to the lower end of the body metal fitting 1 in a sealed state.

Reference numeral 4 denotes an upper end mounting metal fitting fixedly attached to an opening portion close to an upper end of the body metal fitting 1 and is formed as a substantially turn-over concave shape by a drawing or spinning process from a plate member, and a bolt 5 for mounting an engine is provided in an axial center portion of this upper plate portion in a projecting manner. In the upper end mounting metal fitting 4, an opening end portion 4a thereof is fixed to a horizontal upper end flange portion 1a bent and extended outward from an upper end of the cylindrical barrel portion 11 of the body metal fitting 1 by caulking means.

Then, a space 6 surrounded by the upper end mounting metal fitting 4, the body metal fitting 1 and the body rubber portion 3 is formed as an air chamber. Accordingly, it is unnecessary to provide a stepped portion for fixing a partition member and a diaphragm in the case of the liquid-enclosing type in the upper end portion of the body metal fitting 1, and it is sufficient to provide only the upper end flange portion 1a. Therefore, a caulking and fastening operation can be easily performed and it is possible to increase a thickness in order to improve a durability.

Any of a sealed type or an open type can be selected for the space 6 in correspondence to a characteristic, durability and rubber material required for the vibration isolating apparatus.

In the case of the drawing, the engine mounting bolt 5 is inserted through a hole of the upper end mounting metal fitting 4 by press-inserting means from an inner surface (a lower surface) in such a manner as not to upwardly come off. An outer peripheral screw portion 5a is formed on the bolt 5 from a front end to a connection portion with respect to the upper end mounting metal fitting 4, and a washer based nut 5b for supporting a bracket close to the engine and a nut 5c for preventing a slackness and removal of the bolt 5 by locking with the upper end mounting metal fitting 1 are respectively screwed to the screw portion 5a.

When the apparatus is provided with this structure, the bracket close to the engine can be mounted and supported at a position having an optional height by adjusting a meshed position of the washer based nut 5b. A relatively heavy load such as an engine weight given to the bolt 5 is received and supported by the upper end mounting metal fitting 4 with which the nut 5c for preventing a slackness and removal is locked, so that a slackness and a play can be prevented. In the case of forming the space 6 for the air chamber as a sealed chamber, an air tightness is able to be secured by also using bonding means including an adhesive to the press-inserted portion.

Further, an open end portion 1b disposed in a lower end of the body metal fitting 1 is outwardly extended at least in two sides opposing to each other, and is formed as a stopper portion 7 covering an upper and a lower surfaces of the extending portion with stopper rubbers 7a and 7b. The stopper rubber 7a close to the upper surface extends to an outer peripheral portion of the cylindrical barrel portion 11. These stopper rubbers 7a and 7b are attached to the body metal fitting 1 together with the body rubber portion 3 by the vulcanization-bonding means. A thickness of the stopper rubbers 7a and 7b in the stopper portion 7 can be set in accordance with a required characteristic, however, in order to increase a durability at a large load condition, it is preferable to set the rubber thickness to be larger and to set a stopper clearance to be smaller, than those in the case of the liquid-enclosing type. On a surface of the stopper rubbers 7a and 7b, a groove or a projection can be provided for preventing a squeaky sound and a noise.

In this case, to form the stopper portion 7, the opening end portion 1b may be outwardly extended at substantially all around the periphery to be continuous or intermittent in a peripheral direction, so that the stopper portion 7 is formed along all the periphery and is covered by the stopper rubber.

Figure 2:
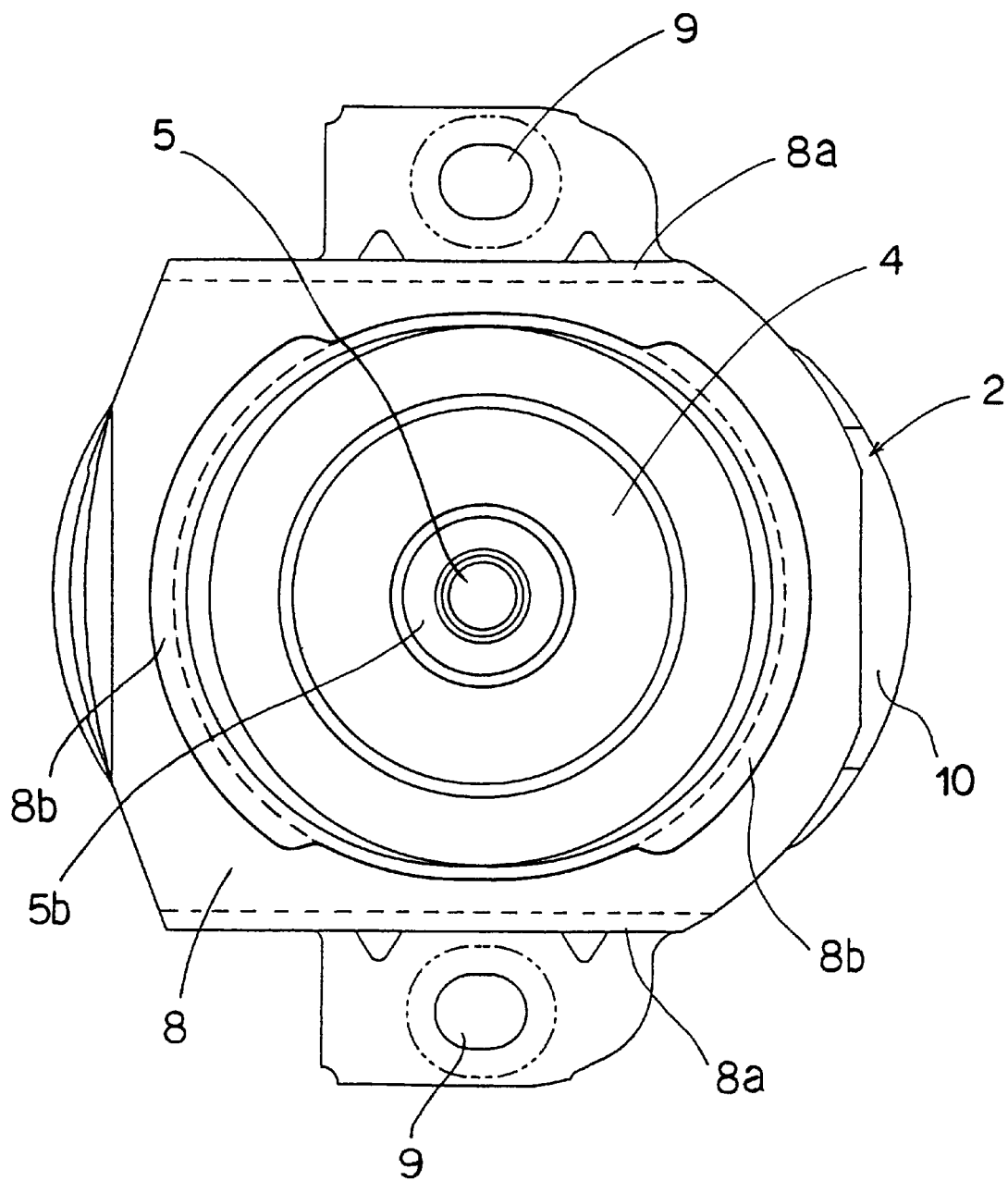
FIG. 2 is a plan view of the same.
Figure 3:
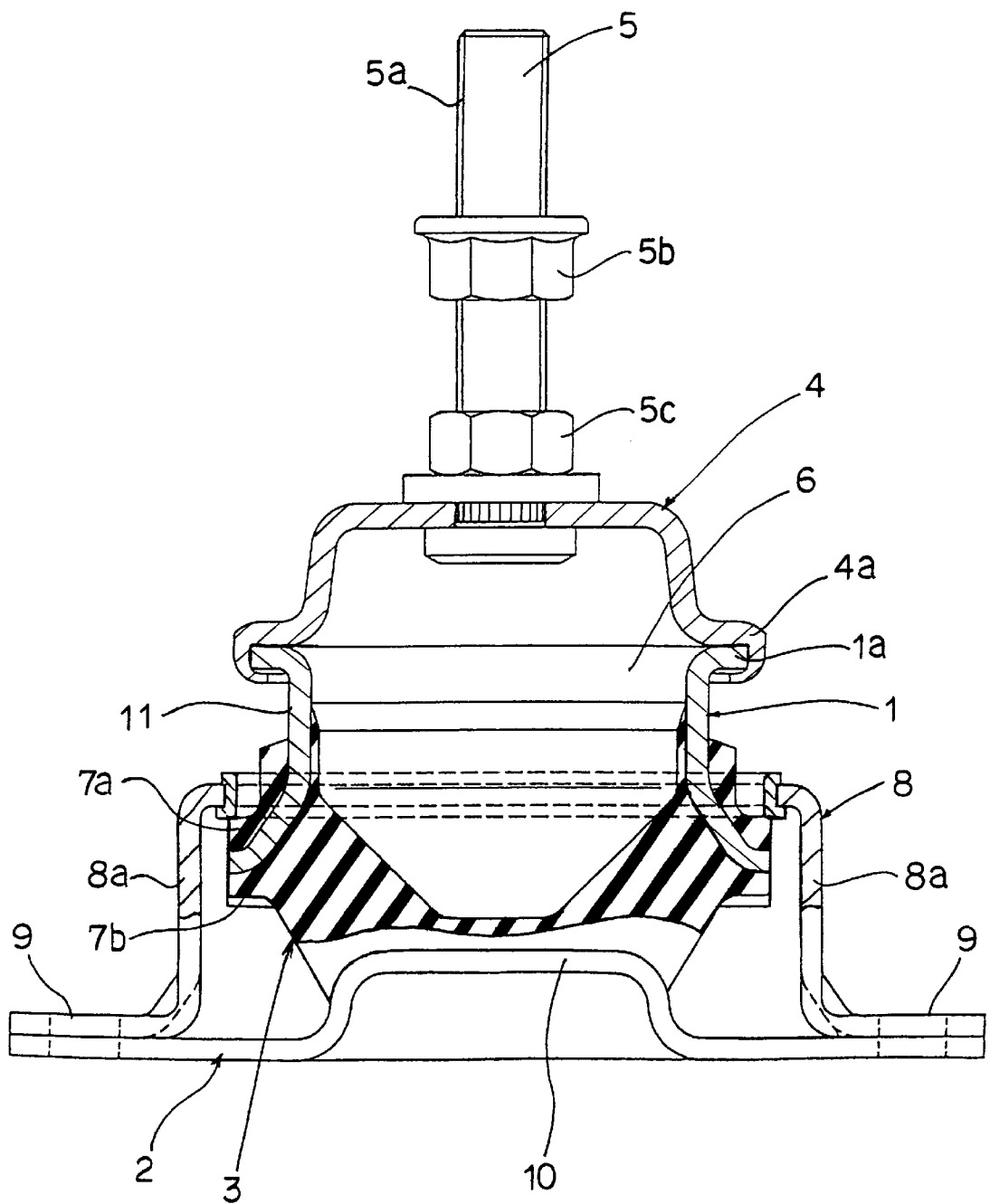
FIG. 3 is a vertical cross sectional view in a cross section perpendicular to the case in FIG. 1.

An annular stopper metal fitting 8 is provided on the stopper portion 7 in an annular shape in such a manner as to have a predetermined interval with respect to the outer peripheral surface of the barrel portion 11 in the body metal fitting 1, as shown in FIG. 2. The stopper metal fitting 8 is, as shown in FIG. 3, for example, extended from its both side edges opposing to each other in a direction perpendicular to the both stopper portions 7 opposing to each other, and mounting leg portions 8a and 8a hanging down are integrally fixed to the lower end mounting metal fitting 2 by welding means or screwing means and are held at a position having a fixed height from the lower end mounting metal fitting 2. Particularly, the stopper metal fitting 8 can be provided in such a manner as to integrally fastened and fixed to two or more (two in the case of the drawing) fastening portions 9 and 9, of the lower end mounting metal fitting 2, for fastening onto a frame or a bracket related to a vessel body or a vehicle body. In this case, at the same time of being mounted to the vessel body, the stopper metal fitting 8 is fastened and fixed in such a manner as to be independent from the body portion of the vibration isolation apparatus, so that the replacing operation can be easily performed. Reference numeral 8b denotes a protecting metal fitting attached to an inner peripheral edge of the stopper metal fitting 8.

In the case of FIG. 1, it is illustrated that the upper surface of the stopper portion 7 is brought into contact with the stopper metal fitting 8, however, this shows a state that the load of the supporting engine is not given. In a used state that the load of the engine is given, the stopper portion 7 keeps a predetermined interval apart from the stopper metal fitting 8. Accordingly, the mounting height of the stopper metal fitting 8 is set by taking account the elastic force of the body rubber portion 3.

Reference numeral 10 denotes a stopper receiving portion formed by projecting a part of the lower end mounting metal fitting 2, which is provided in such a manner as to be brought into contact with the stopper portion 7 when the stopper portion 7 largely displaces downward so as to restrict a further displacement, that is, a further compression of the body rubber portion 3. Accordingly, the body metal fitting 1 and the body rubber portion 3 is structured such that the stopper portion 7 can vertically displace within the interval between the stopper metal fitting 8 and the stopper receiving portion 10.

The vibration isolating apparatus having the above structure is used for supporting the engine in a vibration isolating manner in the supporting portion mainly of the engine of the compact vessel or the automotive vehicle. In this used state, the stopper portion 7 is apart from the stopper metal fitting 8 due to the supporting load and is positioned between the stopper metal fitting 8 and the lower stopper receiving portion 10 so as to be kept in a state of allowing a certain degree of vibration.

Further, when a large upward displacement is generated due to the vibration, the stopper portion 7 integrally formed with the body metal fitting 1 is brought into contact with the annular stopper metal fitting 8 fixed to the lower end mounting metal fitting 2 so that a further displacement is restricted. On the other hand, when a large load (a large displacement) is given downward, the stopper portion 7 is brought into contact with the stopper receiving portion 10 of the lower end mounting metal fitting 2 so that a further compressing deformation is restricted. Still further, when the body metal fitting 1 is largely displaced to back, forth, left or right in the direction perpendicular to the axial direction, the portion of the stopper rubber 7a extending to the outer periphery of the cylindrical barrel portion 11 is brought into contact with the inner periphery of the stopper metal fitting 8 so that a further displacement is prevented. Accordingly, the stopper operation is secured and well performed, and the body rubber portion 3 is not damaged.

Further, since there is no requirement of a special structure such as a step for fixing a partition member and a diaphragm which are required for a double-chamber, liquid-enclosing type vibration isolating apparatus, the apparatus can be firmly fixed despite of a simple structure by caulking the upper end mounting metal fitting 4 to the upper end flange portion 1a of the body metal fitting 1, and it can be easily performed to increase a thickness.

Accordingly, for example, when the structure of the liquid-enclosing type vibration isolating apparatus is changed merely at the thickness, the shape of the stopper rubber and the structure of the caulking portion, the durability against a large load can be widely improved without changing the mounting operability such as the fastening position and the height.

Figure 4:
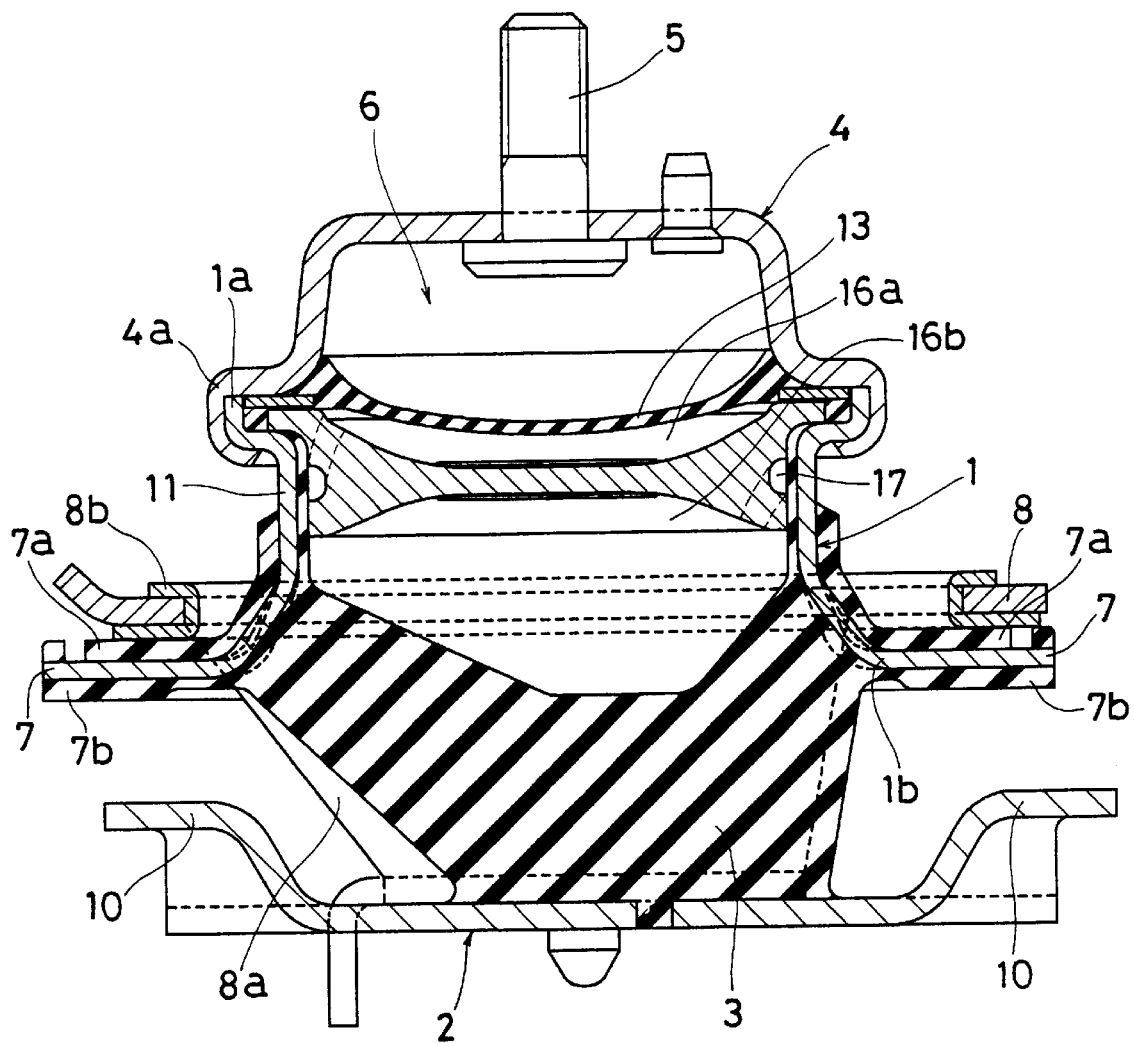
FIG. 4 is a vertical cross sectional view which shows a vibration isolating apparatus in accordance with another embodiment.

FIG. 4 shows an embodiment of a liquid-enclosing type vibration isolating apparatus suitable for the engine mount used for the automotive vehicle. In this embodiment, the same reference numerals are attached to substantially the same elements in the embodiment mentioned above.

In the vibration isolating apparatus in accordance with this embodiment, a diaphragm 13 constituted by a rubber film and opposing to the body rubber portion 3 is disposed in the internal space 6 surrounded by the body metal fitting 1, the upper end mounting metal fitting 4 for covering the upper end opening of the body metal fitting 1 and the body rubber portion 3 for covering the lower end opening of the body metal fitting 1, while a partition member 15 tightly fitted to the inner periphery of the body metal fitting 1 is disposed between the diaphragm 13 and the body rubber portion 3. In a peripheral edge portion of each of these diaphragm 13 and the partition member 15 is fastened by caulking to the upper end flange portion 1a of the body metal fitting 1 together with the opening end portion 4a of the upper end mounting metal fitting 4. Accordingly, the space between the body rubber portion 3 and the diaphragm 13 is formed as two liquid chambers 16a and 16b separated by the partition member 15, and the two liquid chambers 16a and 16b are communicated with each other by an orifice 17 formed on the outer periphery of the partition member 13.

In this case, the stopper operation can be given by the stopper portion 7 of the body metal fitting 1, the stopper metal fitting 8 and the stopper receiving portion 10 in the same manner as that mentioned above, so that a high endurance against a large load can be secured.

In the case of the vibration isolating apparatus in accordance with this embodiment, the body rubber portion 3 deforms due to the vibration of the engine so that a volume change is generated in the two liquid chambers 16a and 16b separated by the partition member 15, as a result, the liquid flows in a reversible manner through the orifice 17. Accordingly, a durability against the large displacement and a good vibration damping effect can be achieved by the flow resistance of the liquid and the vibration isolating effect of the body rubber portion 3 as mentioned above.

What is claimed is:

1. A vibration isolating apparatus wherein lower-end-side opening portion of a cylindrical body metal fitting and a lower mounting metal fitting disposed below the body metal fitting are connected to each other by a body rubber portion disposed between the both metal fittings, an upper end mounting metal fitting to which an engine mounting bolt is provided in a projecting manner is fixedly attached to a flange portion of an upper end portion of said body metal fitting by caulking-for-fastening means, the lower-end-side opening edge portion of said body metal fitting is extended outward at least in two sides opposing to each other so as to form a stopper portion having an upper and a lower surfaces covered with a stopper rubber, an annular stopper metal fitting is disposed on or above the stopper portion in such a manner as to provide a predetermined interval from an outer peripheral surface of the body metal fitting, and said stopper metal fitting is fixed to the lower end mounting metal fitting.

2. A vibration apparatus as recited in claim 1, wherein a part of said lower end mounting metal fitting is formed as a stopper receiving portion which is brought into contact with said stopper portion when said stopper portion largely displaces downward.

3. A vibration isolating apparatus as recited in claim 1 or 2, wherein an internal space surrounded by said body metal fitting, said upper end mounting metal fitting for covering the opening close to an upper end of said body metal fitting, and said body rubber portion for covering the opening close to the lower end of the body metal fitting is formed as an air chamber, and both of the upper end flange portion of said body metal fitting and the upper end mounting metal fitting are directly caulked and fastened.

4. A vibration isolating apparatus as recited in claim 1 or 2, wherein in an internal space surrounded by said body metal fitting, said upper end mounting metal fitting for covering the opening close to an upper end of said body metal fitting and said body rubber portion for covering the opening close to the lower end of the body metal fitting, a partition member and a diaphragm constituted by a rubber film is disposed in such a manner as to oppose to said body rubber portion and is fastened by caulking onto the upper end flange portion of the body metal fitting together with the upper end mounting metal fitting, a space held between said body rubber portion and the diaphragm is formed as two liquid chambers which are filled with a liquid in a sealed manner and are separated by a partition member, and the two liquid chambers are communicated with each other by an orifice disposed in the outer periphery of the partition member.

* * * * *